(12) United States Patent
Rempel

(10) Patent No.: US 6,809,321 B2
(45) Date of Patent: Oct. 26, 2004

(54) DYNAMICALLY OPTIMIZED COINCIDENCE SEPTA

(75) Inventor: Trudy D. Rempel, Glen Ellyn, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 150 days.

(21) Appl. No.: 10/207,155

(22) Filed: Jul. 30, 2002

(65) Prior Publication Data

US 2004/0021081 A1 Feb. 5, 2004

(51) Int. Cl.$^7$ ............................................ G01T 1/164
(52) U.S. Cl. ........................... 250/363.1; 250/363.03
(58) Field of Search ......................... 250/363.1, 363.03

(56) References Cited

U.S. PATENT DOCUMENTS

2003/0230723 A1 * 12/2003 Garrard et al. .......... 250/363.1

OTHER PUBLICATIONS

T. G. Turkington, W. H. Sampson, "Optimizing Septal Spacing for Gamma Camera PET Imaging." 2000 IEEE Nuclear Science Symposium, Conference Record, vol. 3, Lyon France, Oct. 15–20, 2000, p. 17–67.*

* cited by examiner

*Primary Examiner*—Constantine Hannaher

(57) ABSTRACT

Spacing of septa (septa pitch) used in coincidence imaging is varied to maximize imaging count rate in coincidence imaging by PET or Hybrid PET. This is accomplished through use of detector performance indicators, which are used in connection with a processor to determine the point of peak performance. These detector performance indicators can be, but are not limited to single photon count rate, detector dead time or detector busy time.

23 Claims, 2 Drawing Sheets

DYNAMICALLY OPTIMIZED COINCIDENCE SEPTA

BACKGROUND OF THE INVENTION

1. Field of the Invention

The present invention relates generally to radiographic imaging, of the sort used in nuclear medicine, and more particularly to an improved method and apparatus for maximizing count rate in imaging by Positron Emission Tomography (PET) or Hybrid PET.

2. Description of the Background Art

Radiographic imaging involves the detection of radiation from a distributed radiation field, to form an image. The detection of radiation may lead to information on the structure or on a process of the test subject targeted.

Gamma rays are a form of radiation typically used in radiographic imaging because they have the ability to pass through soft tissues and bones. For these reasons gamma rays are useful in medical imaging, particularly in creating images of a particular organ or an area of interest in the body. This technology provides physicians a non-invasive diagnosis technique to evaluate the performance and function of a targeted area.

To generate these gamma rays a radioactive marker/tracer (radiopharmaceutical) is injected into a test subject. The radioactive marker then travels to the target area, where it is absorbed or retained. As the radioactive marker decays it emits a positron, which soon thereafter collides with an electron. On impact, the positron and electron annihilate each other, generating gamma rays in opposite directions. These gamma rays are predictable and once emitted they can further be detected and used in creating an image.

The radiographic imaging device used to detect the gamma rays are known as gamma ray cameras. Typically gamma cameras utilize a scintillation crystal (usually made of sodium iodide) which absorbs the gamma photon emissions and emits light photons (or light events) in response to the gamma absorption. The amount of, or intensity of the gamma rays detected, is reflected in the emission of the gamma photons. This is known as the scintillation process.

These photons which are more easily detected than radiation, are then detected by a photon detection sensor. Typically the sensors are photomultiplier tubes, which convert the detected photons into a representative electrical signal. These electrical signals are then processed to form an image.

However, the image may not be completely representative of the targeted organ or area. Often, single photon activity from outside the camera field of view (FOV) affects the image. The effect of this activity includes but is not limited to: dead time effects, random coincidence counts and scatter coincidence counts (where coincidence counts are used to measure when two events have occurred within a particular time frame).

In coincidence imaging, septa are aligned within the transaxial planes, normal to the center axis of the cylindrical FOV, to limit the effects of activity outside the camera, such as dead time effects and random coincidence counts. Further, but to a lesser extent, septa may also limit scatter coincidence counts. However, the septa may also reduce the sensitivity to true coincidence counts within the detector. Therefore, there is a tradeoff in septa design, which requires a balance between the reduction of outside activity and the reduction in true coincidence counts, in order to achieve the optimum count rate performance.

The activity concentration (for example patient average) that yields the optimum count rate performance depends on the septa design, and in particular on the septa pitch (septa-to-septa spacing). The Noise Equivalent Count(NEC) rate is one measure of the rate at which the PET camera accumulates good data as a function of the amount of tracer. The peak NEC rate for 3D imaging (no septa), for example, can occur at an activity concentration that is a factor of 3 smaller than for 2D imaging (approximately 1 cm pitch).

In previous implementations, a PET or Hybrid PET camera had the choice of either using one realization or septa spacing, or not using septa at all in coincidence imaging. The point of activity at which the peak NEC rate is achieved, and not the peak NEC rate itself, can substantially be changed due to the interplay of single photon sensitivity, coincidence sensitivity, dead time and scatter fraction scenarios. Further, the patient activity concentration may also vary over a large range, for reasons such as the patient weight, and dose and post-injection imaging time. Therefore, the limited choice of 2D (one septa realization) or 3D (no septa) may not optimize the count rate performance of the camera.

SUMMARY OF THE INVENTION

The present invention provides an apparatus and method for optimizing the imaging count rate for either the PET or Hybrid PET camera, using dynamically optimized septa. An apparatus is provided according to the first aspect of the invention, which can employ either inter-plane septa or surface mounted septa. Further, the septa are dynamically adjustable, to achieve optimum coincidence count rate performance. The septa are adjusted based on the findings of detector performance indicators, such as single photon count rate, dead time, or busy time.

According to the second aspect of the invention, a process is described in which detector performance indicators are used to alter the spacing of the septa. The process can be implemented in two forms, either by an automated system or a manual system. In an automated system, the dynamically optimized septa uses the detector indicator performance indicator to automatically adjust the septa spacing, to achieve optimum count rate performance. In an manually adjusted system, the detector performance indicators are used to indicate to the user what the septa spacing is to obtain optimum count rate performance. The user would then manually adjust the septa spacing, as recommended.

The dynamically optimized septa adjusts the septa spacing to optimize the PET or Hybrid camera imaging count rate. The dynamically optimized septa may be implemented in at least three ways to determine the point of peak performance, which include: single photon count rate, detector dead time or detector busy time. As an example, the invention is described in terms of imaging the thorax using single photon count rate as a detector performance indicator.

The above and other features and advantages of the present invention will be further understood from the following description of the preferred embodiments thereof, taken in conjunction with the accompanying drawings.

DETAILED DESCRIPTION OF THE PREFERRED EMBODIMENTS

The following description describes implementation of the dynamically optimized septa by single photon count rate, which is one of at least three performance indicators 130 which can be used.

Figure 1:
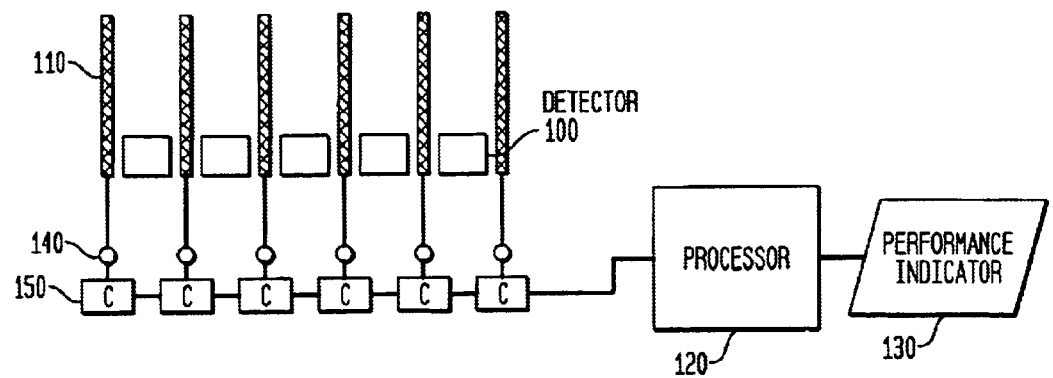
FIG. 1 is a cross-sectional diagram (not to scale) showing a PET detector with inter-plane septa, including independent drives, independent controllers, a processing apparatus and detector performance indicator.

According to the invention, optimum imaging count rate can be found by changing the septa design, in particular, varying the septa pitch. Further, this invention employs a dynamically optimized septa, to achieve the optimum imaging count rate. FIG. 1 shows a PET with inter-plane septa 110, where the point of peak imaging count rate versus the number and configuration of septa engaged in the imaging cylinder is known for a given protocol. Typically this point is at one target single photon count rate for all configurations.

In the first embodiment, at the start of the protocol, the patient is positioned in the camera FOV. The number of septa engaged in the camera and inserted into the imaging cylinder for the subsequent scan is determined by the single photon count rate, which is the detected by the detector 100. The amount of change in septa design required is determined by the processor 120, which then signals to the independent controllers 150, whether to engage the independent drives 140. The number of septa engaged would dynamically change before the scan to fix the single photon count rate at the target value. In the event of a detection of an extremely high single photon count rates, all septa would be engaged.

Figure 2:
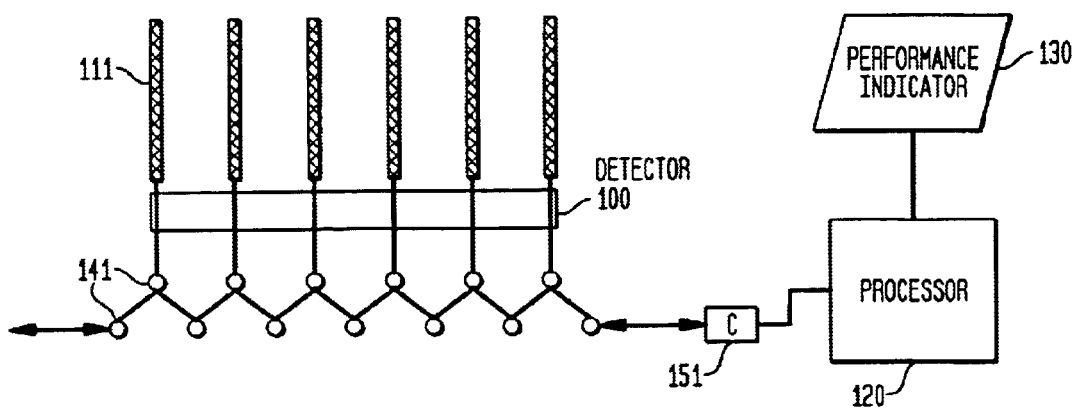
FIG. 2 is a cross-sectional diagram (not to scale) showing a large FOV Detector Hybrid PET detector with surface mounted septa, including a controller, interlinked drives, processing apparatus and detector performance indicator.

FIG. 2 shows a Detector Hybrid PET with a large FOV, including surface mounted septa 111. The point of peak imaging count rate versus the septa pitch is known for the camera. Typically, this point is at one target single photon count rate for all configurations. At the start of the protocol, the patient is positioned in the camera FOV. The septa pitch for the subsequent scan is determined by the single photon count rate, which is detected by the detector 100. The amount of change required in septa pitch is determined by the processor 120, which then signals a controller 151, as to whether to engage certain inter-linked drives 141. Where extremely high single photon rates are detected, the minimum septa pitch would be engaged. The septa pitch would dynamically change before the scan to bring and fix the single photon count rate at the target value.

Figure 3:
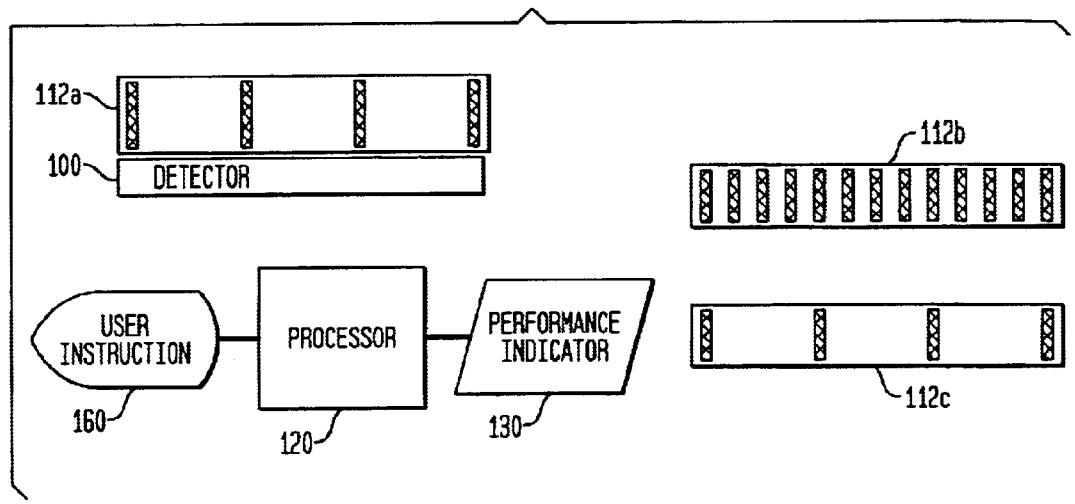
FIG. 3 is a cross-sectional diagram (not to scale) showing a large FOV Detector Hybrid PET detector with loaded septa, including additional loaded septa of various septa pitch, processing apparatus, performance indicator and user instruction controls.

FIG. 3 also shows a Detector Hybrid PET with a large FOV, including a variety of loaded septa 112. The point of peak imaging count rate versus septa pitch is known for the camera. Typically, this point is at one target single photon count rate for all configurations. At the start of the protocol, the patient is positioned in the camera FOV, or the patient equivalent concentration would be calculated from patient weight, dose and post-injection time. The septa pitch for the subsequent scan is determined by the processor 120, using the measured single photon count rate or the patient equivalent dose. The user instruction 160 is to allow the user to change the septa pitch to obtain the recommended optimum count rate, by manually changing the loaded septa. For extremely high single photon rates or dose, a version of septa 112b with minimum septa pitch would be engaged. For a lower equivalent dose, the septa pith would be selected from a number of available versions with wider septa pitch 112a & 112c, before the scan to fix the single photon count rate near the target value.

Further, the patient bed overlap and corrective normalizations for bed knitting between the body scans would be tailored to the septa configuration and pitch used for each bed scan. The patient attenuation and scatter correction would also be tailored to the septa configuration and pitch used for each scan.

What is claimed is:

1. A PET or Hybrid PET apparatus, which uses septa in coincidence imaging, and adjusts septa spacing, comprising:
   a radiation-sensitive detector;
   dynamically optimized septa positioned proximate said detector, in which the spacing or pitch of said septa are adjustable to achieve an optimum imaging count rate;
   a processor that detects a preselected performance indicator, which is used by said processor to determine the amount of change in the said septa's pitch needed to achieve an optimum imaging count rate; and
   a drive mechanism that adjusts the pitch of said septa by the amount determined by said processor.

2. The apparatus of claim 1, wherein said radiation-sensitive detector is a gamma scintillation crystal.

3. The apparatus of claim 1, further comprising a controller stage, which controls said drive mechanism in accordance with a drive signal from said processor.

4. The apparatus of claim 3, wherein said controller stage consists of a plurality of independent controllers.

5. The apparatus of claim 3, wherein said controller stage consists of one controller.

6. The apparatus of claim 1, wherein said drive mechanism consists of a plurality of independent drives.

7. The apparatus of claim 1, wherein said drive mechanism consists of a plurality of interlinked drives.

8. The apparatus of claim 1, wherein said septa are inter-plane septa.

9. The apparatus of claim 1, wherein said septa are surface mounted to said radiation-sensitive detector.

10. The apparatus of claim 1, wherein said septa are loaded septa.

11. A method for automatically optimizing imaging count rate in coincidence imaging done by PET or Hybrid PET apparatus, which uses detector performance indicators and a processor to dynamically adjust septa spacing of a pitch-adjustable septa, comprising the steps of:
   detecting a performance indicator from imaging data produced by a detector in response to a patient positioned in said detector's FOV;
   based on detection of said performance indicator, determining the septa spacing, which would be needed for optimum imaging count rate;
   relating to a controller stage of the PET or Hybrid PET apparatus the necessary adjustments in said septa spacing to achieve optimum imaging count rate and
   physically adjusting the septa spacing based on said necessary adjustment to achieve the optimum imaging count rate.

12. The method of claim 11 where said detector is a gamma scintillation crystal.

13. The method of claim 11 where one of at least three performance indicators, describes peak performance.

14. The method of claim 13, where a peak performance indicator is single photon count rate.

15. The method of claim 13, where a peak performance indicator is detector dead time.

16. The method of claim 13, where a peak performance indicator is detector busy time.

17. A method for manually optimizing imaging count rate in imaging done by PET or Hybrid PET apparatus, which uses detector performance indicators and a processor to dynamically adjust septa spacing of a pitch-adjustable septa in coincidence imaging, comprising the steps of:

detecting a performance indicator from imaging data produced by a detector in response to a patient positioned in said detector's FOV;

based on detection of said performance indicators, determining the septa spacing, which would be needed for optimum imaging count rate;

indicating to a user what septa spacing is needed for optimum imaging count rate; and engaging the appropriate loaded septa in accordance with said indicated septa spacing, which achieves optimum imaging count rate.

18. The method of claim 17, where said detector is a gamma scintillation crystal.

19. The method of claim 17, where one of at least three performance indicators, describes peak performance.

20. The method of claim 19, where a peak performance indicator is single photon count rate.

21. The method of claim 19, where a peak performance indicator is detector dead time.

22. The method of claim 19, where a peak performance indicator is detector busy time.

23. A dynamically adjustable septa device for use in PET or hybrid PET medical imaging, comprising:

a plurality of radiation-impervious septum members;

a plurality of drive mechanisms coupled to respective ones of said septum members; and at least one controller that actuates said plurality of drive mechanisms to vary the pitch or spacing between each of said plurality of radiation-impervious septum members.

* * * * *